United States Patent [19]
Rhoades

[11] Patent Number: 5,181,107
[45] Date of Patent: * Jan. 19, 1993

[54] TELEPHONE ACCESS INFORMATION SERVICE DISTRIBUTION SYSTEM

[75] Inventor: Donald E. Rhoades, Miami, Fla.

[73] Assignee: Interactive Television Systems, Inc., Miami, Fla.

[*] Notice: The portion of the term of this patent subsequent to Sep. 24, 2008 has been disclaimed.

[21] Appl. No.: 763,301

[22] Filed: Sep. 20, 1991

Related U.S. Application Data

[63] Continuation-in-part of Ser. No. 423,946, Oct. 19, 1989, Pat. No. 5,051,822.

[51] Int. Cl.⁵ .............................................. H04H 1/02
[52] U.S. Cl. ..................................... 358/86; 455/4.2; 455/5.1; 455/6.2
[58] Field of Search ................. 455/3, 4, 5, 6, 3.1, 455/3.3, 4.1, 4.2, 5.1, 6.2, 6.3; 358/84, 86, 1.4

[56] References Cited

U.S. PATENT DOCUMENTS

| | | | |
|---|---|---|---|
| 4,506,387 | 3/1985 | Walter | 455/3 |
| 4,521,806 | 6/1985 | Abraham | 358/86 |
| 4,567,512 | 1/1986 | Abraham | 358/86 |
| 4,580,161 | 4/1986 | Petrus et al. | 358/86 |
| 4,584,603 | 4/1986 | Harrison | 358/86 |
| 4,590,516 | 5/1986 | Abraham | 358/86 |
| 4,623,920 | 11/1986 | Dufresne et al. | 380/20 |
| 4,677,685 | 6/1987 | Kurisu | 455/4 |
| 4,734,764 | 3/1988 | Pocock et al. | 358/86 |
| 4,761,684 | 8/1988 | Clark et al. | 388/86 |
| 4,763,191 | 8/1988 | Gordon | 358/86 |
| 4,829,372 | 5/1989 | McCalley et al. | 358/86 |
| 4,866,515 | 9/1989 | Tagawa et al. | 358/86 |
| 4,890,320 | 12/1989 | Monslow et al. | 455/3 |
| 5,051,822 | 9/1991 | Rhoades | 455/4 |

Primary Examiner—Reinhard J. Eisenzopf
Assistant Examiner—Lisa D. Charouel
Attorney, Agent, or Firm—Jacobson, Price, Holman & Stern

[57] ABSTRACT

A digital, interactive communication system designed to provide a plurality of remote subscribers with any one of a variety of stored information service software packages through the use of a home computing assembly maintained within the subscriber's home and structured to display video as well as generating audio on a standard television receiver. A bi-directional communication link is established over telephone lines between the home computing assembly and a central remote information storage center wherein a selected one of the variety of information services is transmitted as a modulated carrier to the subscriber. Information service selection is controlled by a remote information storage center executive software program. Automatic billing is performed by computing equipment maintained in the remote information storage center and transmitted to a headquarters which also receives diagnostic messages associated with the remote information center and/or the associated plurality of home computing elements.

20 Claims, 12 Drawing Sheets

TELEPHONE ACCESS INFORMATION SERVICE DISTRIBUTION SYSTEM

This application is a continuation-in-part application of application Ser. No. 07/423,946, filed Oct. 19, 1989, now U.S. Pat. No. 5,051,822.

FIELD OF THE INVENTION

This invention relates to a home computing assembly capable of establishing a digital, interactive communications system providing a plurality of subscribers access to a variety of information services stored in a plurality of remote information services storage centers. The information services may include, for example, mall shopping services, moves as memory comes on line, personal dating services, grocery shopping service, catalog sales, classified advertising, contests and video games, with the possibility of buying a product and having it delivered to a user's home. The invention also provides for the use of a standard television receiver for video and audio, and contemporary input devices to interact with the software program, in the instances where the selected one of the variety of information services is a video game or some other interactive service. A bi-directional telephone link is established between the home computing assembly and a remote information services storage center to access the desired information service, and a cable television broadcast channel is used uni-directionally to transmit the selected information service software program as digital streams of data to the home computing assembly.

BACKGROUND OF THE INVENTION

Much is known about video gaming devices for the home. Presently, all require non-volatile game cartridges to store the game software programs, and use known color graphics circuits along with synthesized audio techniques. Game cartridges are relatively expensive to purchase, and once they are used for some time, they are used rarely thereafter. This has led to the proliferation of video game rental outlets as individuals decide that they would rather have variety than ownership, and would also rather make a shorter and less expensive commitment.

Prior art patents representing known communication or subscriber systems are represented in U.S. Pat. No. 4,829,372 to McCalley et al., wherein a digital, interactive communication system is accessible to a plurality of subscribers who can select any of a plurality of pre-recorded video/audio presentations for viewing on a conventional television set. The system includes a converter tuned to a channel for monitoring a digital stream of information including digital packets representative of video/audio presentations selected by the individual subscribers. A subscriber server is housed within the apparatus supplied the individual subscriber and the subscriber server receiving uniquely addressed digital packets converts the received packets into NTSC-compatible analog formatted video/audio presentation for transmission to the requesting subscriber.

In addition, Abraham, U.S. Pat. Nos. 4,567,512 and 4,590,516, disclose a system controlled through conventional telephone networking in conjunction with a home controller that contains a micro-processor and incorporating a telephone interface which allows a subscriber to request a given program which is available on a pre-scheduled time basis. Abraham does not disclose digital transmissions.

In addition, Abraham discloses in U.S. Pat. No. 4,521,806 signal traffic paths being established for telephone communication and cable program transmission in a basic subscription broadcast system. The program material is stored at a library broadcast station in analog form and is digitized and time compressed after readout for transmission to the subscribers along the cable paths.

Other patents demonstrating the prior art of the same subject matter include U.S. Pat. No. 4,734,764 to Pocock et al., U.S. Pat. No. 4,761,684 to Clark et al., and U.S. Pat. No. 4,763,191 to Gordon et al.

In addition to the above, U.S. Pat. No. 4,584,603 to Harrison discloses an amusement and information system for use in a closed environment such as on airlines wherein an entertainment terminal including a keyboard and video display assembly is available for use by the occupant and is structured to provide access to video games as well as movies and other selected information.

Although it is well known to use a bi-directional telephone link, as evidenced by the above-noted patents, to access audio and video information that is transmitted as a related but independent television broadcast channel, it is apparent that a need exists for the transmission of executable computer software program code representing a variety of information services using a television broadcast channel to reach a plurality of subscribers and act upon individual requests.

It is an object of this invention to provide a vehicle whereby a plurality of information service software programs are made available substantially upon demand and upon request to individual subscribers on a "pay-per-use" basis with a minimum of subscriber overhead.

Another object is to provide a home computing assembly that provides the means to utilize said software programs, from within the residence and under subscriber control, and optionally using contemporary game control devices.

SUMMARY OF THE INVENTION

In accordance with the system of the present invention, any of a plurality of individual subscribers may request one of a plurality of information services stored in a software program library at a remote location utilizing a home computing element or assembly to establish a bi-directional telephone communication link with a remote information services storage center to access the services offered. The remote information services storage center acknowledges the request and establishes a bi-directional channel of communications.

The home computing element transmits a unique identification code, an information service select code, the existence of a previously loaded information service software program and any mode commands. During this time, the display on the home computing element shows the status of the operation in progress. If the home computing element cannot establish communications with the remote information services storage center, it will retry several times before dropping the line and indicating a failed communication attempt to the subscriber.

While maintaining communications with the home computing element, the remote information services storage center logs the time, telephone number, identification code, the operating mode and the desired information service selection of the requesting home computing element. If the selected information service is already resident in the home computing element, the remote information services storage center transmits an authorization code to the home computing element effectively enabling the software program, and drops the telephone line. An information service software program is not transmitted in this case, but if the selection is not in the home computing element memory, the remote information services storage center transmits the encoded information service software program and the home computing element identification code as a digital bit stream of information over a television broadcast channel. The telephone line is maintained active until all tasks have been completed.

The home computing element requesting the information service may receive the information service software program only after identification code validation occurs. This prevents unauthorized use by others. Once reception of all the software data has been successfully completed, the home computing element acknowledges receipt to the remote information services storage center and drops the telephone line. The encoded software program is decoded and is enabled t be used. The subscriber is told through the display that the information service is ready for use. All of these actions occur in a very short period of time.

The home computing element offers the subscriber the means to interact with the information service using contemporary gaming controls or input devices, for example, for selection of services or purchases. The information service may be used as many times as desired. Each time the subscriber restarts the information service, a telephone link is established with the remote information services storage center for billing and authorization for use before the information service may be used. The software program remains in memory until either power is removed or a new software program is loaded. Even though a program may be resident within the home computing element, its use is restricted unless authorization is issued by the remote information services storage center. The remote information services storage center always maintains an activity log for each subscriber which is used for billing.

BRIEF DESCRIPTION OF THE DRAWINGS

For a fuller understanding of the nature of the present invention, reference should be had to the following detailed description taken in connection with the accompanying drawings.

DETAILED DESCRIPTION OF THE PREFERRED EMBODIMENTS

Figure 1:
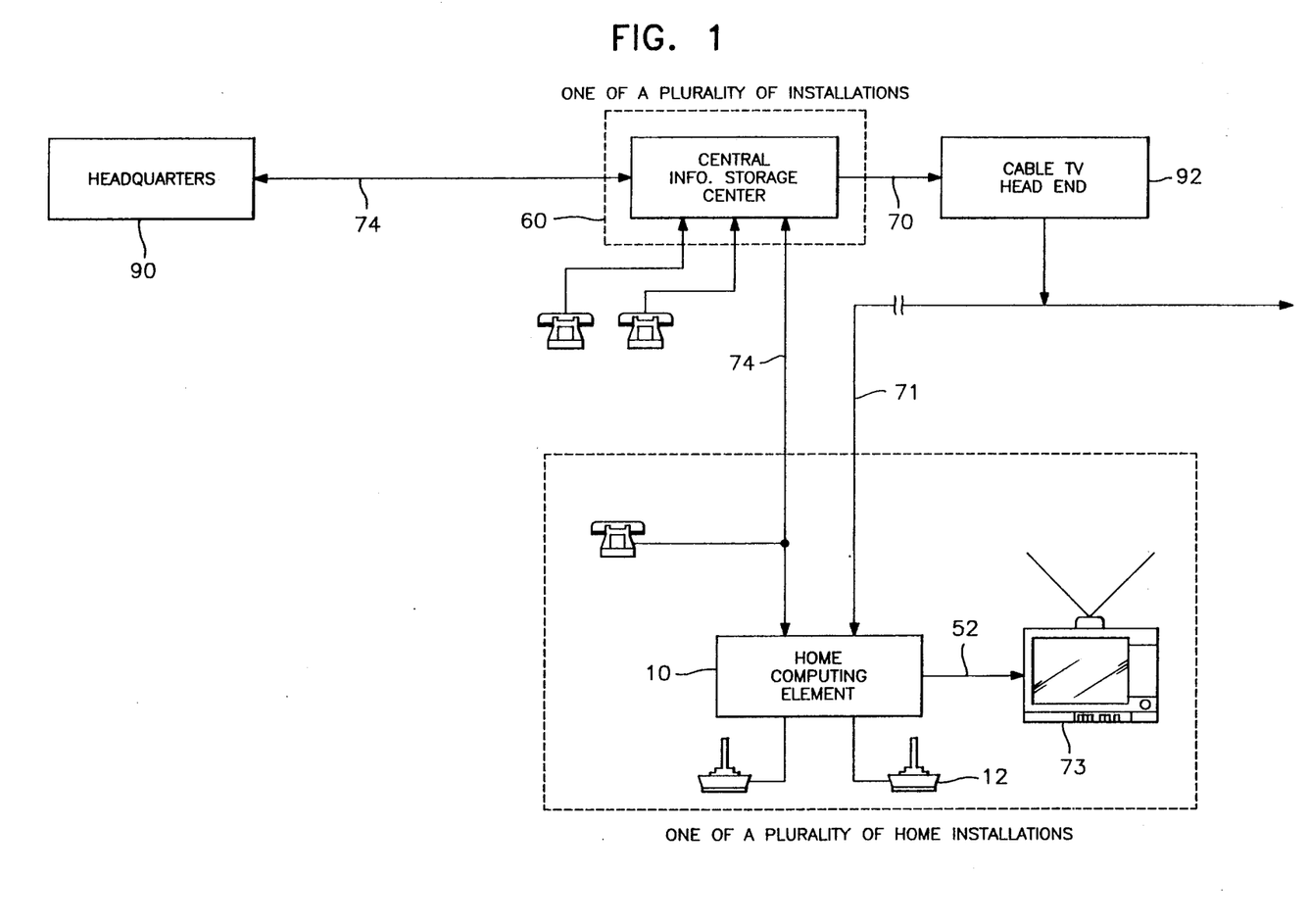
FIG. 1 is a system level block diagram depicting a digital interactive communication system in conjunction with a home computing assembly of the present invention.

Referring to FIG. 1, a preferred embodiment of the present invention comprises a system including a plurality of remote information storage centers 60 which communicate with a plurality of home subscriber installations. Each of the home subscriber installations includes a home computing assembly or element 10, a standard television receiver 73 and, optionally, one or more game control devices 12 for use when a video game is selected.

A digital interactive communications environment is established using a plurality of voice quality telephone lines 74 and a television broadcast facility such as a cable television (CATV) network, defined in FIG. 1 as a cable TV head end 92, which is linked to the home subscriber installations and more particularly, the home computing element 10 by cable 71. It should be noted that the telephone lines 74 directly connect the remote information storage center 60 with the home computing element 10 and also connect the remote information storage center with a headquarters 90, to be described in greater detail hereinafter.

The home subscriber utilizes the home computing element 10 to call the remote information services storage center 60 through the telephone line 74. Once a telephone link is established, the subscriber selects any one of a plurality of information services, including for example mall shopping services, personal dating services, moves as memory comes on line, grocery shopping service, catalog sales, travel agency services, floral services, classified advertising, contests, and pre-stored video games, or other software programs which have been previously offered to the subscriber in a menu format.

The service to be selected may include an interaction through the home computing element to arrange for browsing through a service, and the ability to purchase an item and arrange for delivery to a desired location. In the shopping mall service, for example, a three-dimensional, two level mall, complete with landscaping, fountains, escalators and music is displayed on a television receiver, having been downloaded from the remote information services storage center to the home computing element. By use of a joy-stick, a lifelike computer person is guided through the mall into any store to view the contents of the store and to examine products being sold.

Figure 2:
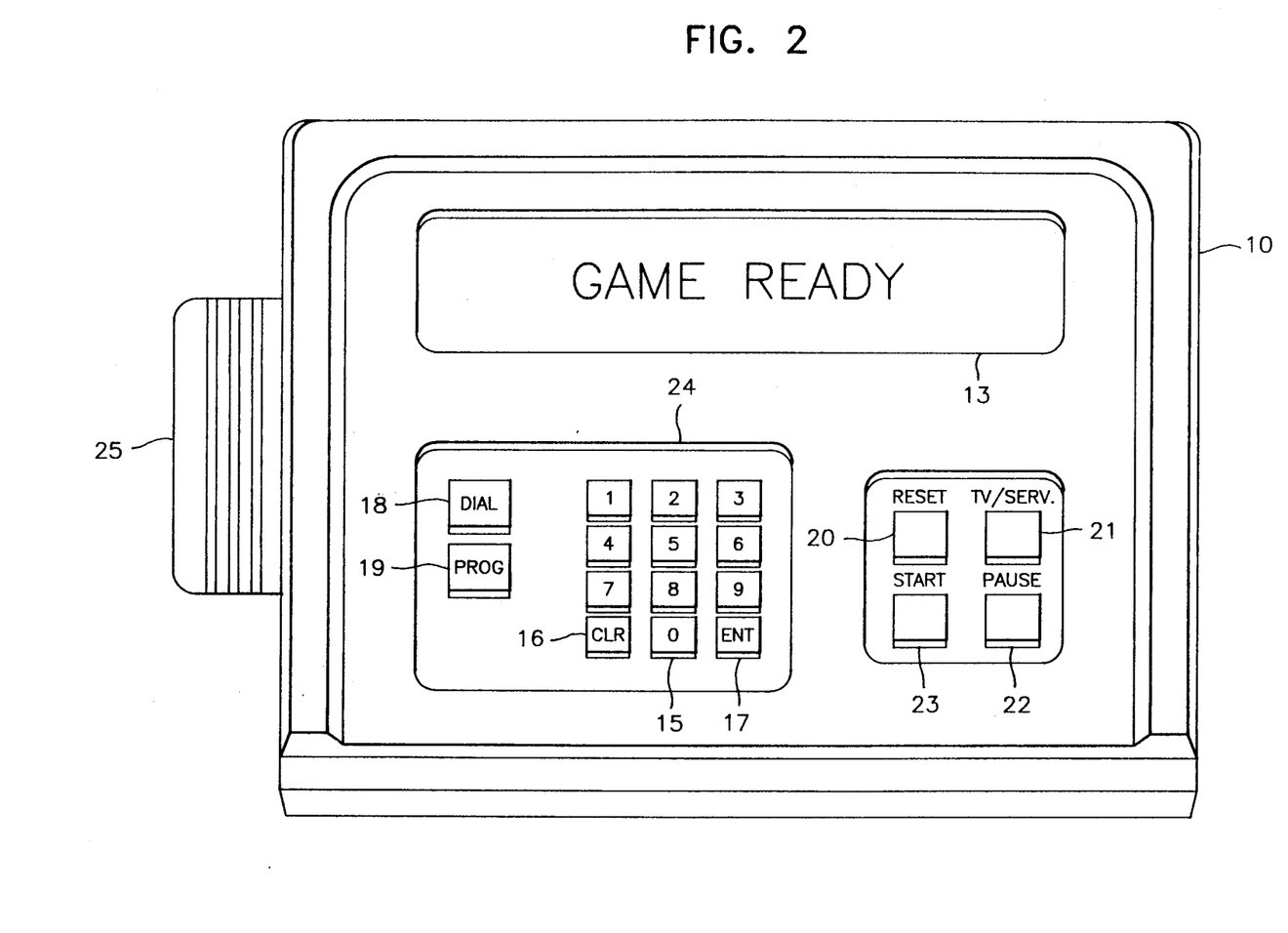
FIG. 2 is a front view of one preferred embodiment of the home computing assembly as represented in block diagram in FIG. 1.

A selection of the particular service is made by pressing the appropriate keys 24 on the home computing element 10 as set forth in greater detail in FIG. 2. The software program representing the selected information service is retrieved from a permanent storage library by a computer facility at the remote information services storage center 60 and transmitted typically to a CATV head end 92 as an encoded stream of digital data 70 in NTSC compatible format. A signal of the encoded stream of digital data is then broadcast through the CATV network along with prerecorded menu information programming to all cable subscribers. All cable subscribers may view the pre-recorded menu information programming portion. However, only the specifically requesting subscriber locations or home installations containing the requesting home computing element 10 can receive, store, decode and use the requested information software programs.

An RF video signal is received from the distribution cable 71, is processed and the resulting, decoded software program stored by the home computing element 10 is then enabled for use by the subscriber in conjunction with display at the conventional television receiver 73. The desired gaming control devices 12 are also usable for subscriber interaction with a video game software program, if selected from the information services.

All billing for use of the subscribed information services is performed automatically by the computer facilities of the remote information storage center 60 and the billing information is transmitted over the telephone lines 74 to the main office or headquarters 90 (see FIG. 1). The headquarters 90 may also request other specific information such as, but not limited to, diagnostic test results from the remote information storage center 60 and may send commands and/or software programs that may be executed by the computer facilities maintained within the remote information storage center 60.

Again with reference to FIG. 2, a preferred embodiment of the home computing element or assembly 10 encompasses an alphanumeric display 13 to demonstrate or display messages. In addition, a keyboard for subscriber interaction, for example, to enter information service selection and commands are represented and includes numerical keys 24. In addition, commands may be entered into the system during us of the home computing element 10.

In operation, the subscriber first uses the numeric keypad 15 further utilizing any of the numerical keys to enter the code number for a selected information service program from a previously provided menu. The clear key 16 is used to correct any data entry errors. Once the entire number is entered the enter key 17 is pressed and the home computing element 10 responds by displaying the selections on the display 13. The dial key 18 is then pressed to call the remote information services storage center 60 and transmit the proper home computing element 10 personal identification number (PIN) and information service selection number by virtue of telephone line 74. The appropriate information service software program is received from cable TV head end 92 by the home computing element 10 where it is decoded and stored. The display 13 indicates that an information service is loaded in the home computing element and ready for use.

Display on TV receiver 73 is started by pressing the start key 23 and paused at any time by pressing the appropriate pause key 22. Pressing pause key 72 again serves to restart the game. The TV/service key 21 ma be pressed to switch to view standard programming on the television receiver 73, overriding the information service display and audio.

In the case of a video game software program selection, the video game software program may be permanently stored in a removable, non-volatile memory card 25 by ensuring that a card is placed in the side slot as appears in FIG. 2. A one time purchase charge will be billed, but the game may be played as often as the subscriber likes using the card 25 without incurring additional costs.

Figure 3:
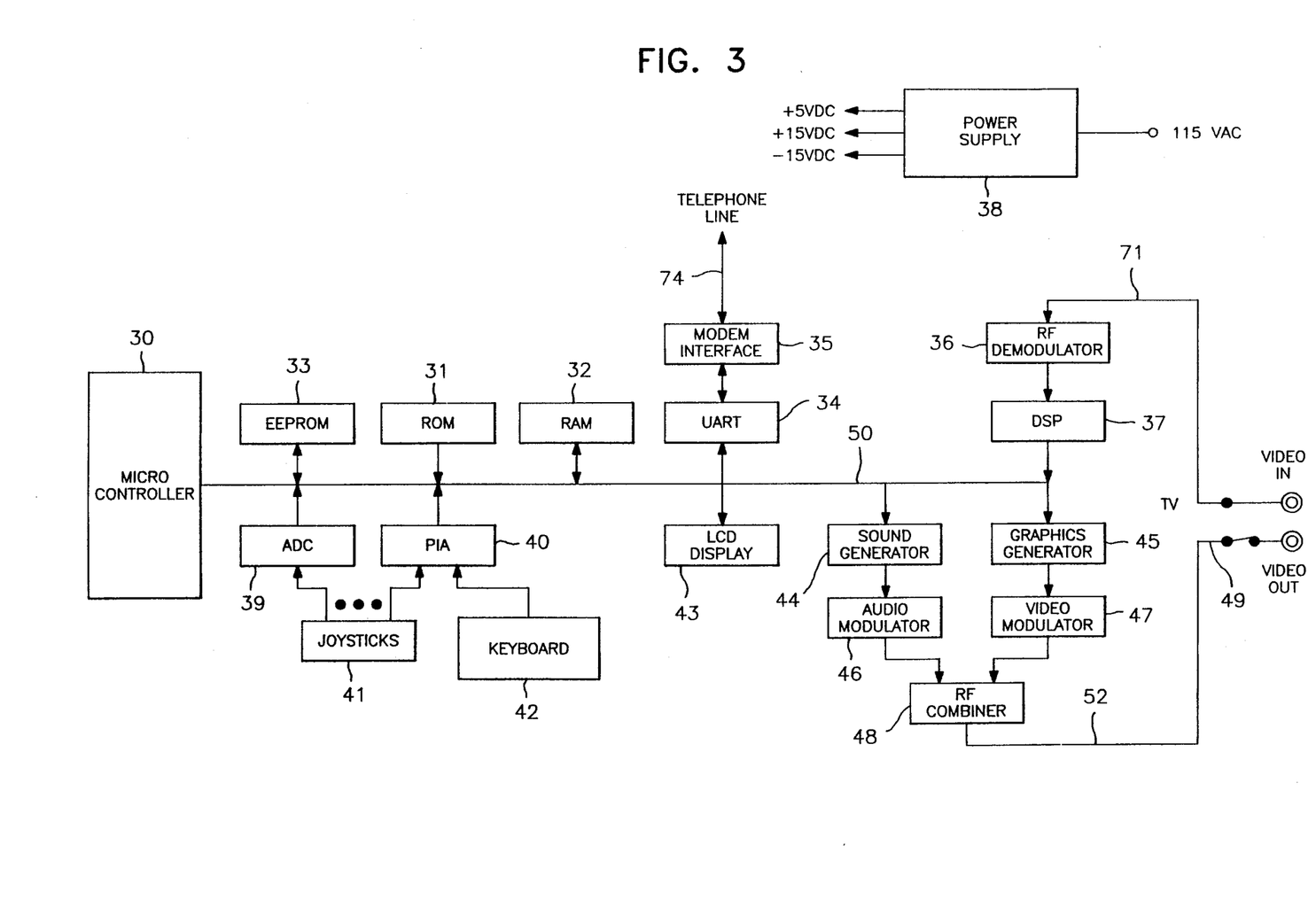
FIG. 3 is a detailed functional block diagram of the home computing assembly shown in FIG. 2.

FIG. 3 is a detailed, internal block diagram which shows all of the major circuits contained in the home computing element 10. The home computing element 10 is based on a microprocessing unit 30 which acts as the overall controller. The micro-computer 30 operates as dictated by the executive program which is stored in the ROM 31. The flow charts as set forth in FIGS. 5 through 12 illustrate the operations related to the executive program in more specific detail.

Data areas required by the executive and external program areas reserved for the use of downloaded information services software programs reside in random access memory (RAM) 32. The memory areas in RAM are volatile and will lose their contents if power is removed, therefore, an electrically erasable programmable read only memory (EEPROM) 33 provides non-volatile storage for such data as the telephone number of the remote information storage center 60 serving the subscriber, the home computing element 10 identification code, and other information that must be retained if power is lost.

As shown in FIG. 3, several circuits are provided to interface the micro-controller or micro-processor unit 30 to the outside world referred to herein as peripheral devices. A telephone link is provided by a universal asynchronous receiver/transmitter (UART) 34 whose digital output keys two distinct audio tones that are transmitted to the telephone line, along with "handshaking" information by a modem interface 35. The modulated outputs are transformer coupled to the telephone line 74. All telephone communications, including automatic dial-up are handled by the micro-processing unit 30 utilizing this circuitry.

The keyboard 42 status is read by the micro-processing unit 30 through a peripheral interface adapter 40 which is capable of interfacing with digital inputs and outputs only. A contact based control adapter is interfaced to the micro-processing unit 30 through the peripheral interface adapter 40, but potentiometer based input devices, such as some joy-sticks and trackballs, if a video game information service is selected, are interfaced through an analog to digital convertor (ADC) 39 which is capable of converting the analog signals provided by the input device to their numeric or binary representations required by the micro-processing unit 30. The display module 13 (see also FIG. 2) containing the internal electronics necessary to display alpha/numeric characters, interfaces directly to the micro-processing unit 30 data bus 50. The display is where all the system status messages are displayed to the subscriber.

Again with reference to FIG. 3, the incoming broadcast channel 71 is monitored for information service software programs. The signal is demodulated by an RF demodulator 36 and then passed to a digital signal processor 37 which samples the signal, converts it to digital data, processes the information and then makes it available to the micro-processing unit 30. The digital signal processor 37 is a single-chip computer tailored to the task of obtaining a digital representation of analog signals and digital processing at a very fast rate; currently up to 33 million operations per second. The digital signal processor 37 acts as a co-processor operating under the control of its own custom software program written in a machine specific computer language.

The NTSC compatible signal 52 that is ultimately connected to the television receiver 73 contains all of the video and audio information associated with the selected information service. The video is generated by the graphics generator circuit 45 which is itself another co-processor, while the sound generator 44 creates all of the audio and is directly controlled by the micro-processing unit 30. The output signals ar used to modulate carriers with the video 47 and audio 46 modulators and then mixed with an RFT combiner 48 whose output is an NTSC compatible television signal 52 that drives the television receiver 73. The TV/SERVICE relay 49 is controlled by the micro-processing unit 30 and connects the output of the combiner 52 to the video output jack. The relay 49 responds to the activity of the TV/SERVICE key 21 as an alternate action device.

Figure 4:
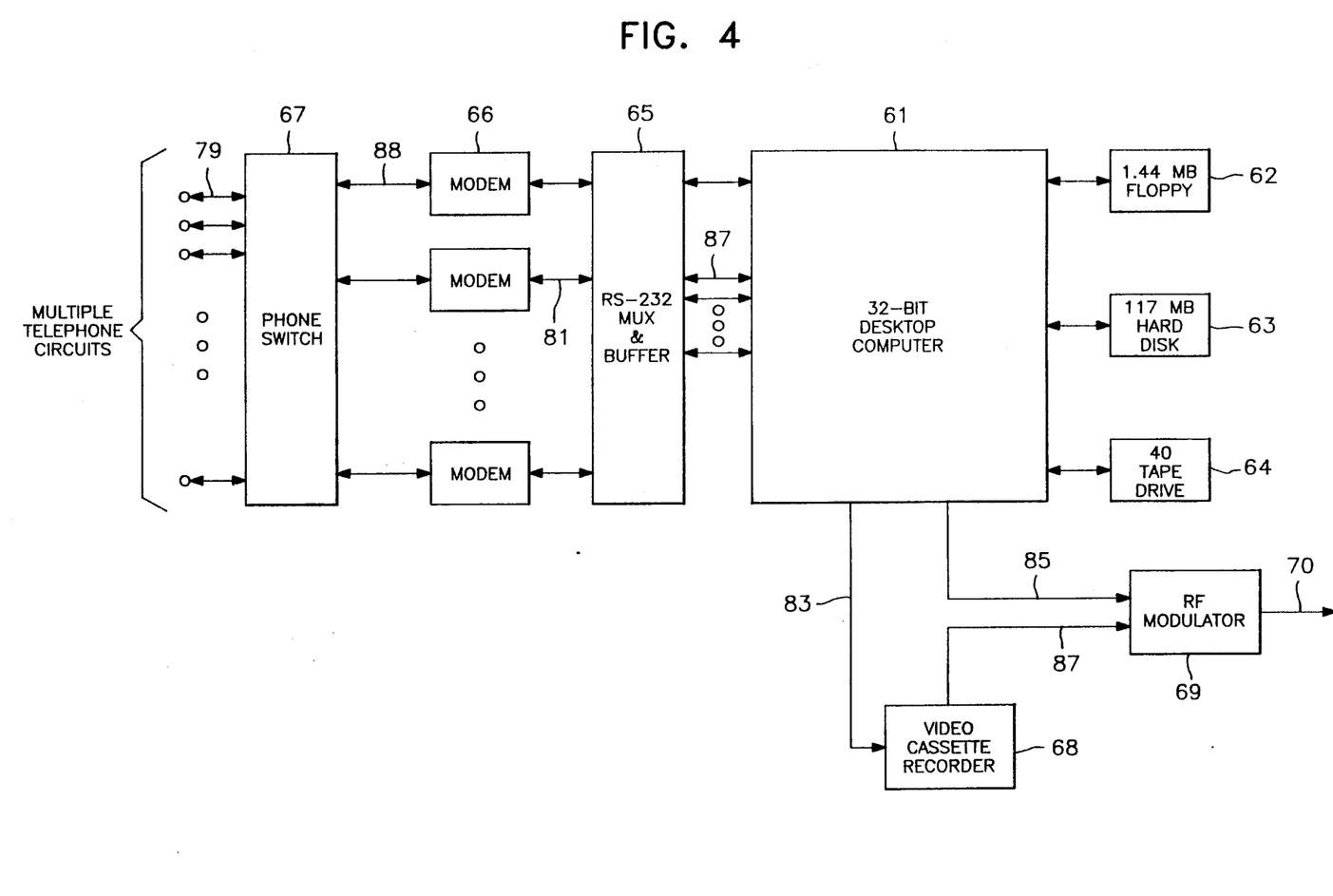
FIG. 4 is a functional block diagram of one embodiment of a remote information storage center of the present invention.
Figure 5:
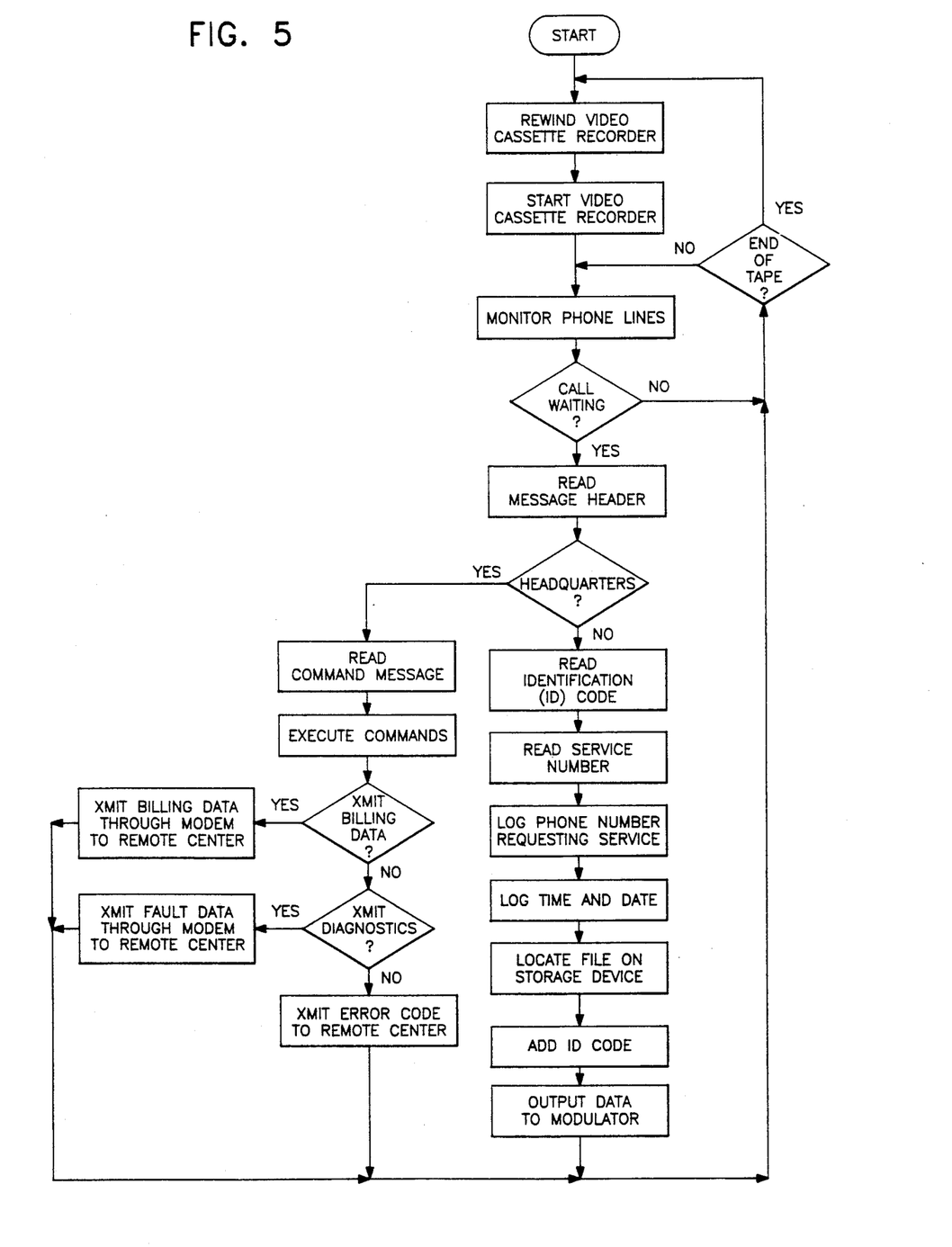
FIG. 5 is a flow chart depicting the operational logic encompassing the remote information storage center of FIG. 4.
Figure 6:
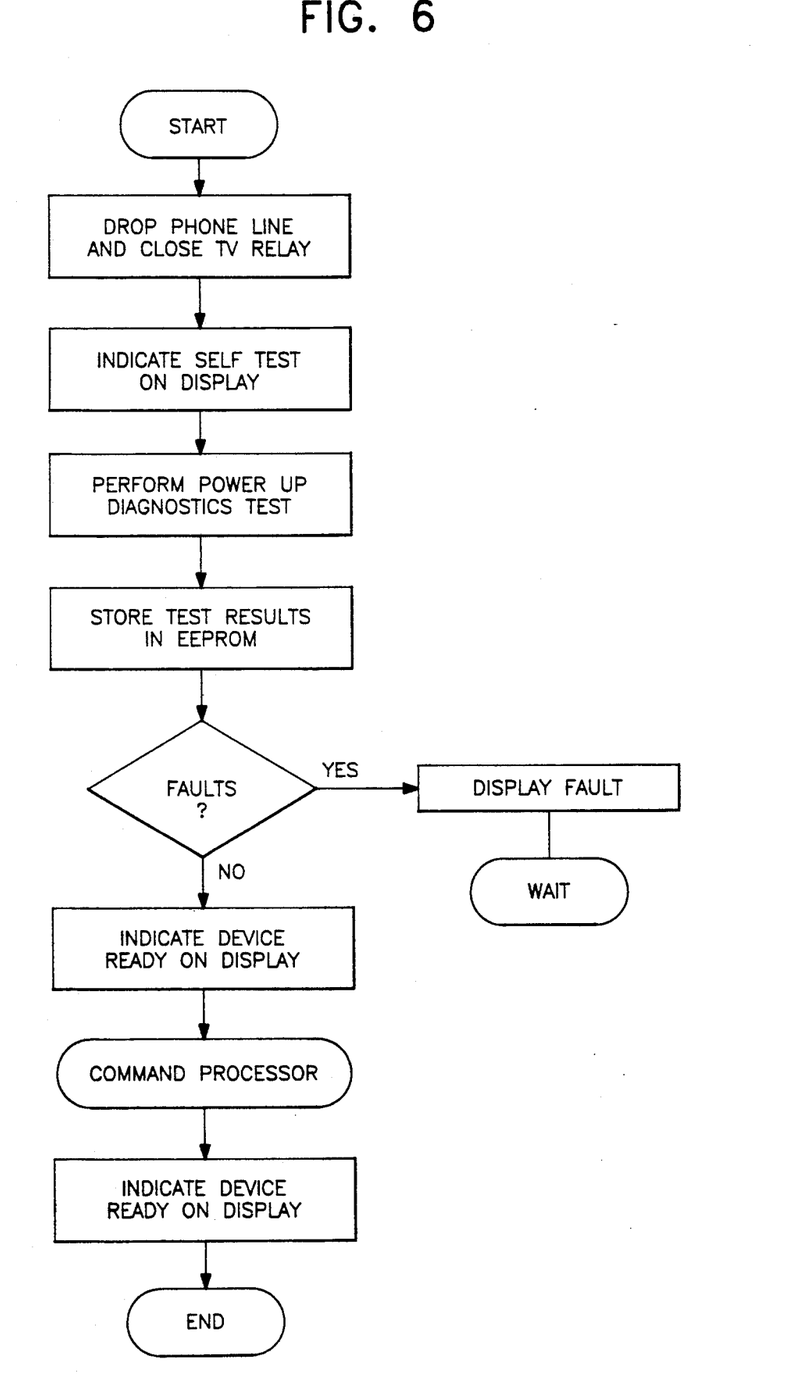
FIG. 6 is a flow chart that relates the tasks performed by a home computing assembly executive program.
Figure 7:
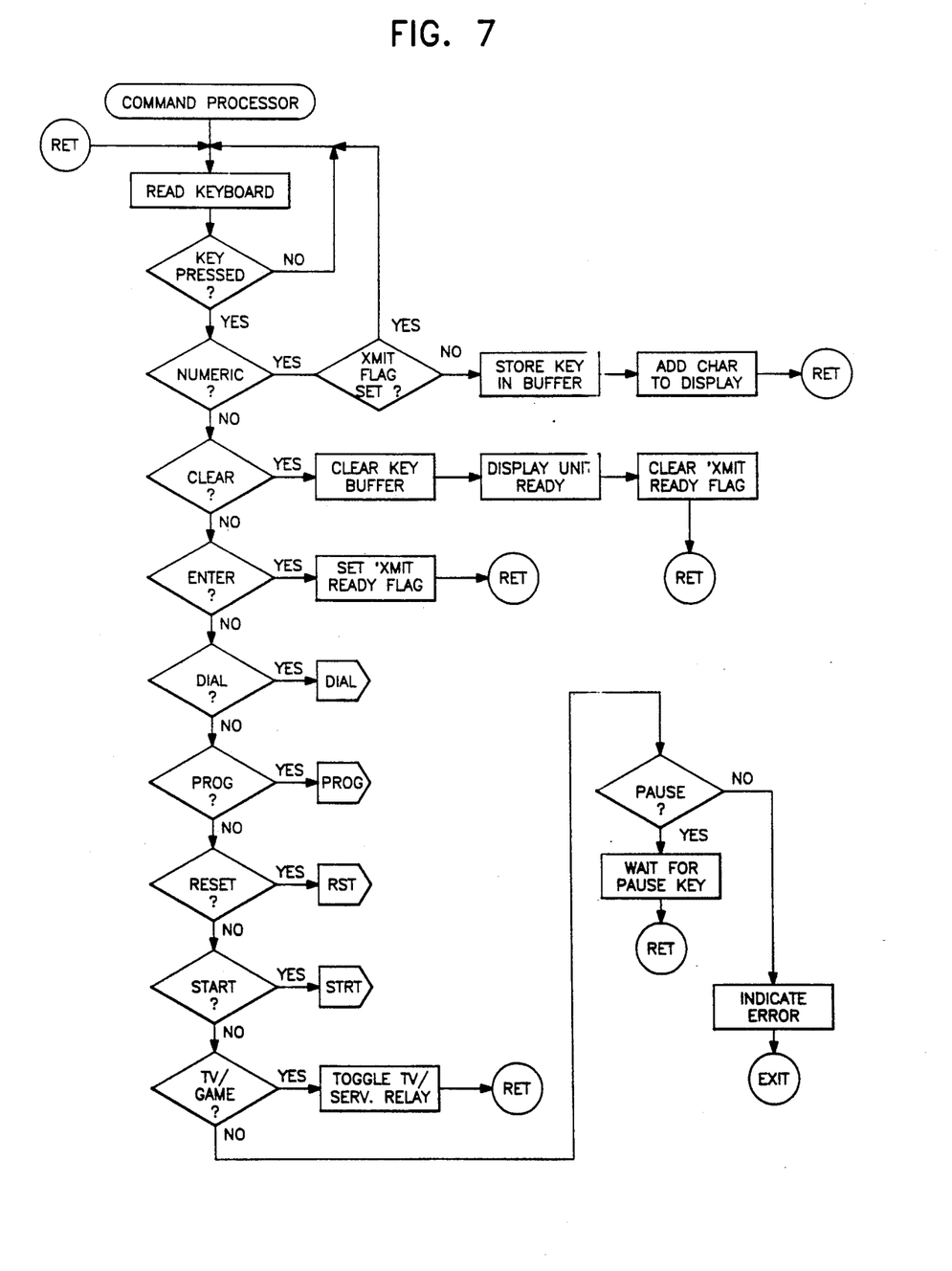
FIG. 7 is a flow chart showing the functional aspects of a command processor defined as part of the home computing assembly shown in FIG. 2.
Figure 8:
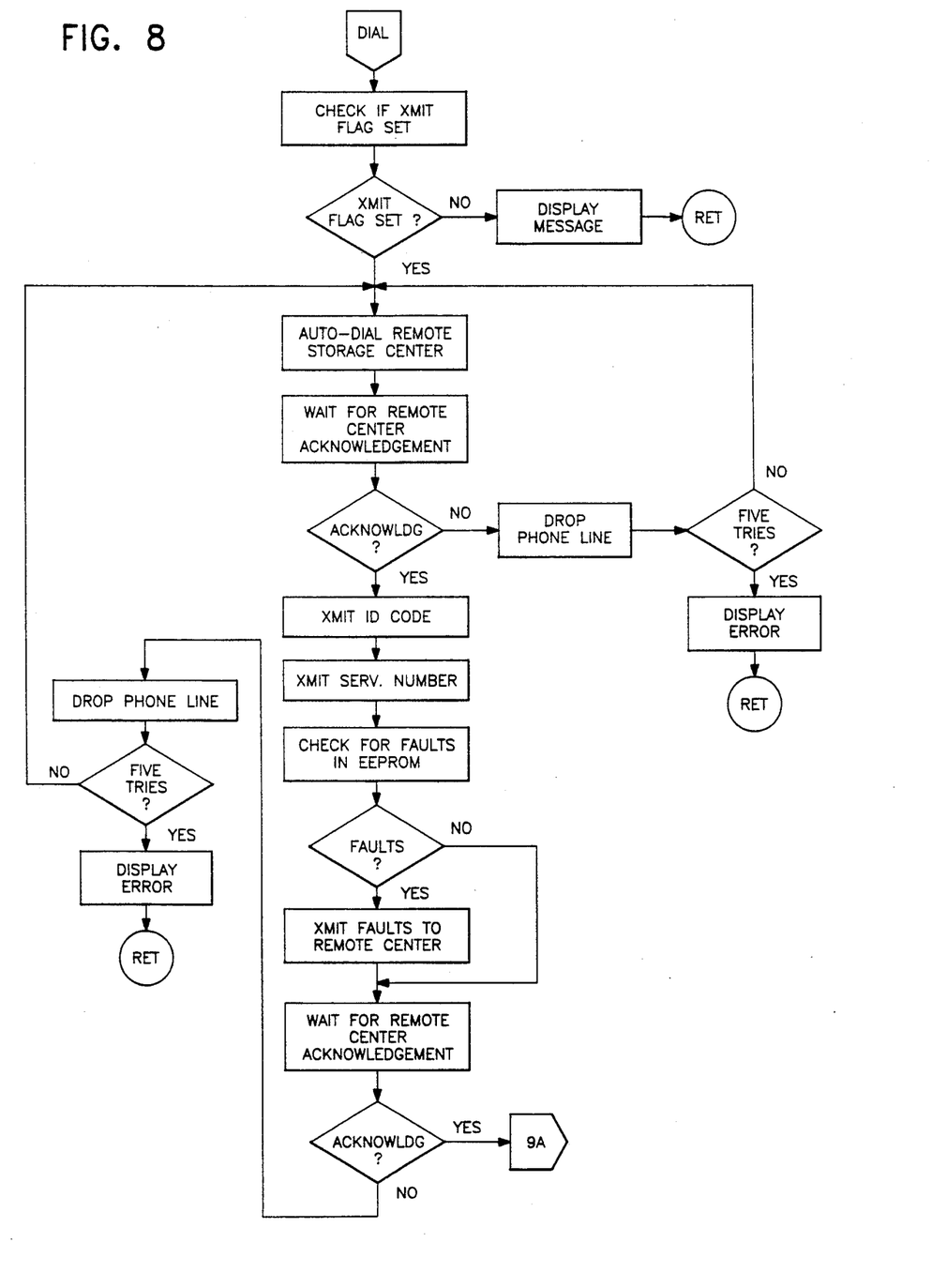
FIG. 8 is a flow chart of the dial-up routine "DIAL" which is invoked by the command processor whose flow chart is shown in FIG. 7.
Figure 9:
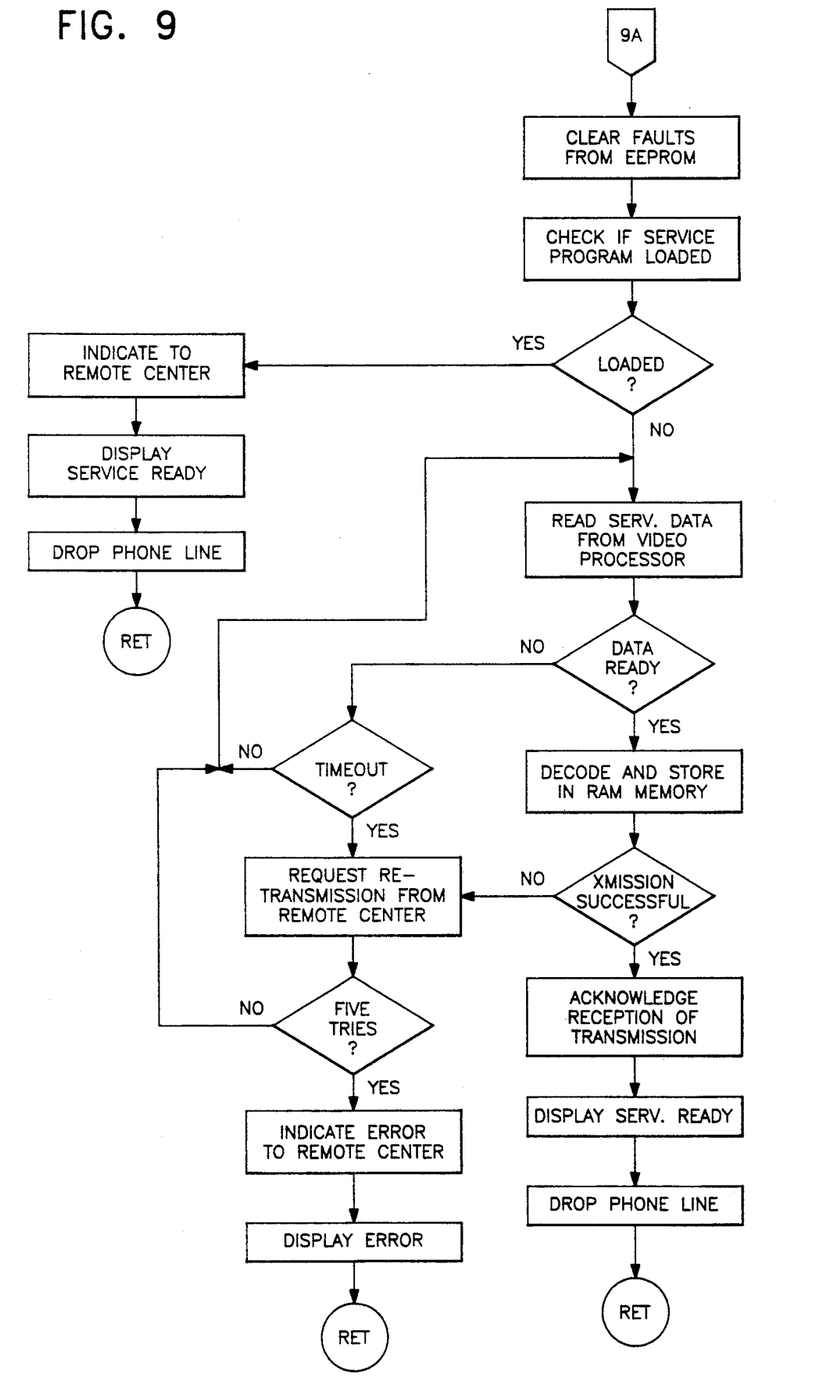
FIG. 9 is a continuation of the flow chart shown in FIG. 8.
Figure 10:
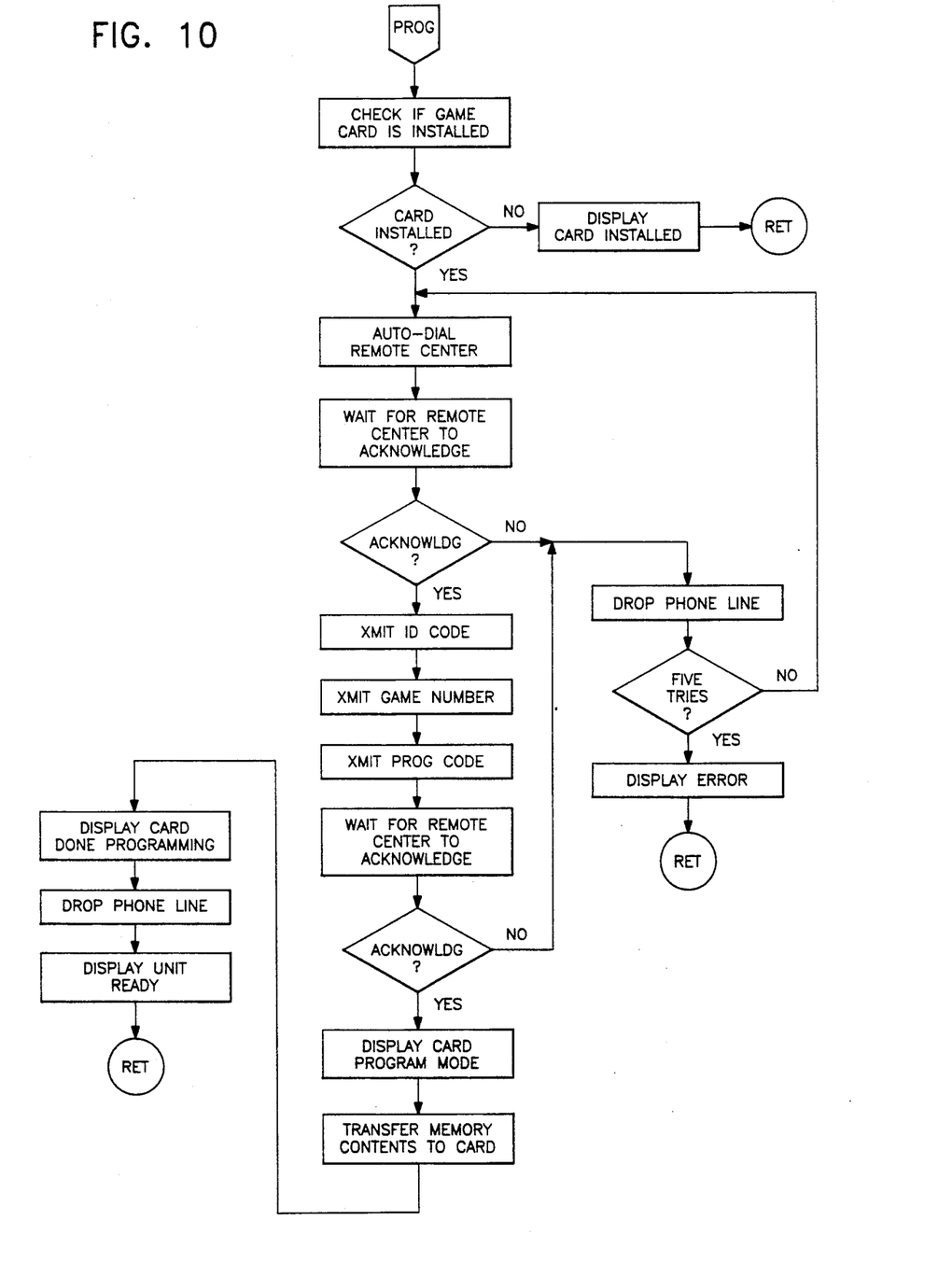
FIG. 10 is a flow chart of the functions performed by the game storage card programming routine "PROG" which is invoked by the command processor of the home computing element whose flow chart is shown in FIG. 7.
Figure 11:
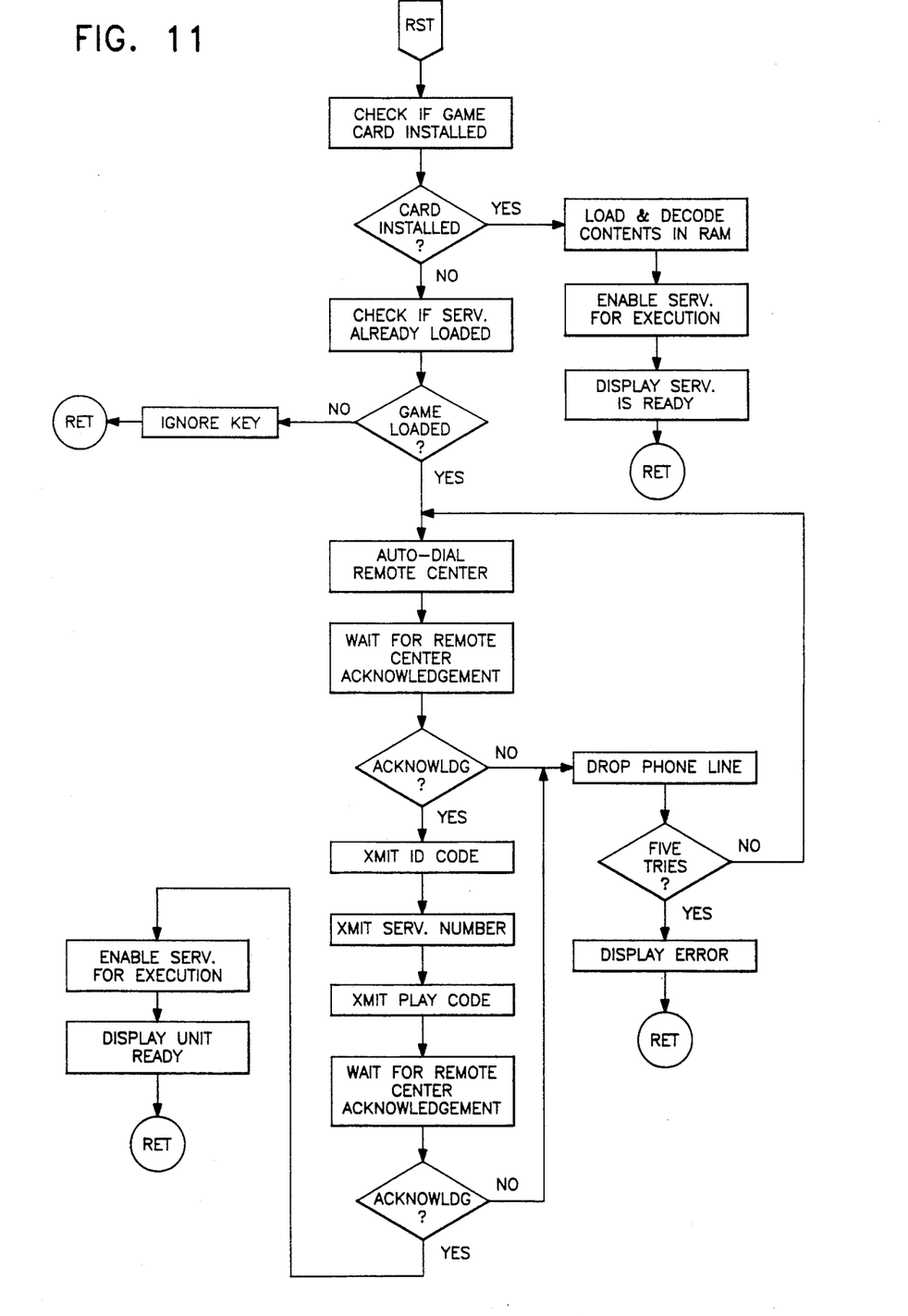
FIG. 11 is a flow chart of the reset information service routine "RST" which is invoked by the command processor whose flow chart is shown in FIG. 7.
Figure 12:
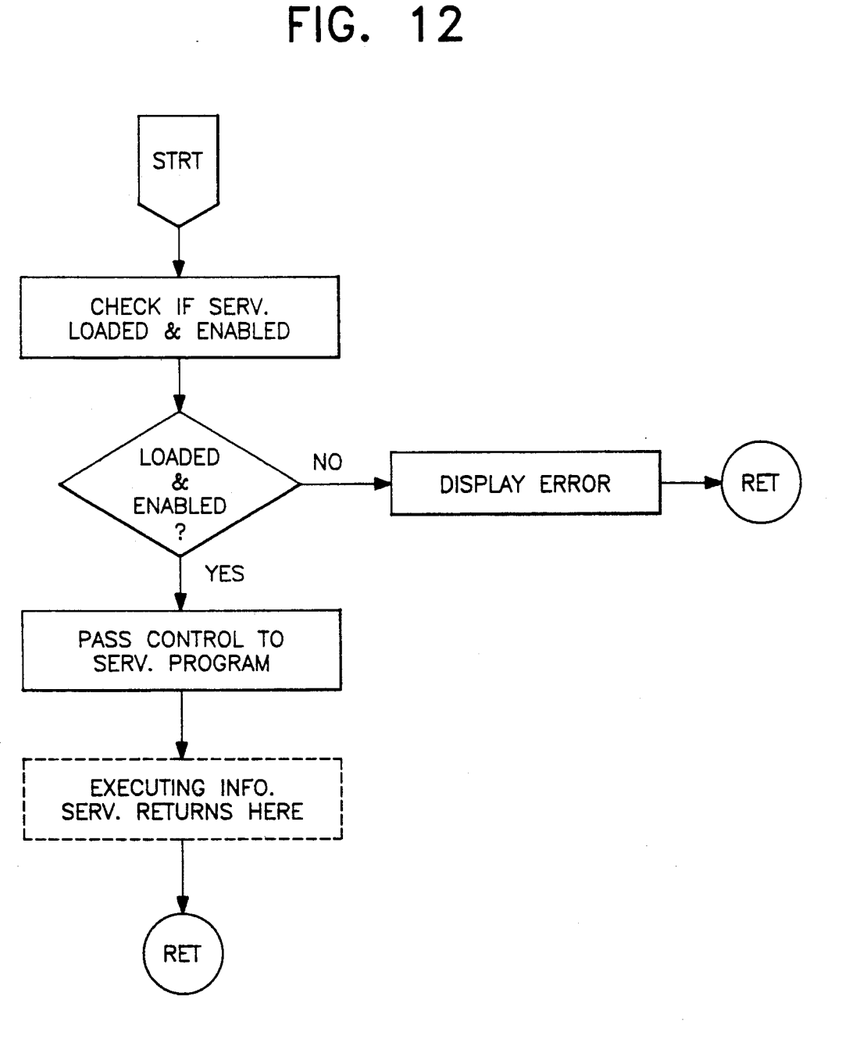
FIG. 12 is a flow chart of the start information service routine "STRT" which is invoked by the command processor whose flow chart is shown in FIG. 7.

With reference to FIG. 4, the remote information storage center 60 (FIG. 1) includes a thirty-two bit desk top computer 61 to perform all required processing, storage and control functions. Storage for the dedicated and information service software is provided by a hard disk 63 with fast access times. The computer 61 is initially loaded from the magnetic tape cartridge drive 64 by a utility invoked from the 1.44 megabyte floppy drive 62 containing the appropriate disk. The utility reads the software programs from the tape drive 64 and stores it on the hard disk 63 for fast, random access of files. The flow chart illustrating the major tasks performed by the executive program of the remote information services storage center 60 is shown in FIG. 5.

The computer 61 is also responsible for controlling telephone access to resident services. A plurality of telephone lines 79 are routed by a telephone switching controller 67 to several modems 66 which convert the FSK telephone signals 80 to RS-232 digital, serial data 81. This data is read and buffered by a RS-232 multiplexer/buffer 65 which allows high speed data transfers through a parallel interface 87 to serve a large plurality of modems 66. These are all bi-directional data paths allowing the computer 61 to receive and transmit data through the telephone. The computer 61 responds to different messages from the subscriber and other messages from the main office or headquarters dealing with information service selections to be broadcast, types of service being provided, diagnostic test results, and billing information and other relevant information requests or command messages.

The last major task performed by the remote information storage center 60 computer 61 is the transmission of the information service software programs that will ultimately be executed in a home computing element 10. The software is output by the computer 61 as a digital bit stream 85 which is modulated and mixed with the signal coming from the video cassette recorder/player (VCR) 68, or other broadcast source by an RF modulator 69. The resulting output 70 is then typically delivered to a CATV head end 92 for distribution. The VCR 68 contains standard pre-recorded programming for broadcast such as an information services menu, and is controlled by the computer 61 through a series of control lines 83.

It is therefore to be understood that the following claims are intended to cover all the generic and specific features of the invention herein described, and all statements of the scope of the invention which, as a matter of language, might be said to fall therebetween.

I claim:

1. A bi-directional, interactive communications system for transmitting in a digital format, information services to a plurality of subscriber locations on demand, said bi-directional communications system comprising:
   a remote information services storage center for storing a variety of information service programs,
   a television broadcast facility for uni-directionally transmitting a selected one of said variety of information service programs,
   a home computing assembly disposed at each subscriber location and connected bi-directionally by telephone lines to the remote information services storage center and also being linked to the television broadcast facility,
   a television receiver connected to said home computing assembly,
   said home computing assembly being structured to receive an individually addressed code from the remote information services storage center and to cause transfer of digital streams of data from the remote information services storage center to the television broadcast facility and transfer of the digital streams of data from the television broadcast facility to said home computing assembly for storage by said home computing assembly upon comparison and matching of an identification code of said home computing assembly with said individually addressed code as received from said remote information services storage center, and
   said home computing assembly including decoder means tuned to a television broadcast channel of said television receiver for monitoring the digital streams of data as transmitted from the television broadcast facility,
   said home computing assembly including digital processing means for receiving the digital streams of data by the requesting one of home computing assemblies, and
   said home computing assembly further including distributed computer processing means for invoking the selected one of said variety of information service programs to perform a task associated with the selected one of said variety of information service programs and means to interact with the selected one of said variety of information service programs as received from the television broadcast facility.

2. A system as claimed in claim 1, wherein each of said home computing assemblies are defined as remote slave computers within a wide area network.

3. A system as claimed in claim 1, wherein each of said home computing assemblies include independent control of video and audio of said television receiver.

4. A system as claimed in claim 1, wherein each of said home computing assemblies include a memory programmer means for permanently recording said selected one of said variety of information services in RAM memory on a programmable memory medium.

5. A system as claimed in claim 1, wherein said remote information storage center includes a self-test diagnostic capability means for allowing access to a fault history map used to isolate malfunctions of one of system, components, telephone links and television broadcast channels.

6. A system as claimed in claim 1, further comprising a computer based adaptive billing sub-system for tracking subscriber activity.

7. A bi-directional, interactive communications system for transmitting in a digital format, information services to a plurality of subscriber locations, said bi-directional interactive communications system comprising:
- a remote information services storage center for storing a variety of information services,
- a television broadcast facility for uni-directionally transmitting a selected one of said variety of information services,
- a home computing assembly disposed at each subscriber location and connected bi-directionally by telephone lines to the remote information services storage center and also being linked to the television broadcast facility,
- a television receiver connected to said home computer assembly,
- said home computing assembly communicating bi-directionally over telephone lines with the remote information services storage center to cause said selected one of said variety of information services to be transferred as digital streams of data with an individually addressed code from the remote storage center to the television broadcast facility and transferred as said digital streams of data from the television broadcast facility to said home computing assembly for storage by said home computing assembly upon comparison and matching of an identification code of said home computing assembly with said individually addressed code as received from said information services storage center,
- said home computing assembly including storage means for storing said digital streams of data as transmitted from the television broadcast facility,
- said home computing assembly further including digital processing means for processing said digital streams of data stored by the storage means and displaying said selected one of said variety of information services on said television when desired.

8. A system as claimed in claim 7, wherein each of said home computing assemblies are defined as remote slave computers within a wide area network.

9. A system as claimed in claim 7, wherein each of said home computing assemblies include independent control of video and audio of said television receiver.

10. A system as claimed in claim 7, wherein each of said home computing assemblies include a memory programmer means for permanently recording said selected one of said variety of information services in RAM memory on a programmable memory medium.

11. A system as claimed in claim 7, wherein said remote information storage center includes a self-test diagnostic capability means for allowing access to a fault history map used to isolate malfunctions of one of system, components, telephone links and television broadcast channels.

12. A system as claimed in claim 7, further comprising a computer based adaptive billing sub-system for tracking subscriber activity.

13. A bi-directional, interactive communications system for transmitting in a digital format, information services to a plurality of subscriber locations on demand, said bi-directional communications system comprising:
- a remote information services storage center for storing a variety of information service programs,
- a television broadcast facility for uni-directionally transmitting a selected one of said variety of information service programs,
- a home computing assembly disposed at each subscriber location and connected bi-directionally by telephone lines to the remote information services storage center, and also being linked to the television broadcast facility,
- a television receiver connected to said home computing assembly,
- said home computing assembly being structured to receive an individually addressed code over telephone lines to the remote information services storage center and to cause transfer of digital streams of data from the remote information services storage center to the television broadcast facility and transfer of the digital streams of data from the television broadcast facility to said home computing assembly for storage by said home computing assembly upon comparison and matching of an identification code of said home computing assembly with said individually addressed code as received from said remote information services storage center, and said home computing assembly including decoder means tuned to a television broadcast channel of said television receiver for monitoring the digital streams of data as transmitted from the television broadcast facility,
- said home computing assembly including digital processing means for receiving the digital streams of data by the requested one of home computing assemblies, and
- said home computing assembly further including distributed computer processing means for invoking the selected one of said variety of information service programs to perform a task associated with one of said variety of information service programs and means to interact with one of said variety of information service programs as received from the television broadcast facility.

14. A system as claimed in claim 13, wherein each of said home computing assemblies are defined as remote slave computers within a wide area network.

15. A system as claimed in claim 13, wherein each of said home computing assemblies include independent control of video and audio of said television receiver.

16. A system as claimed in claim 13, wherein each of said home computing assemblies include a memory programmer means for permanently recording said selected one of said variety of information services in RAM memory on a programmable memory medium.

17. A system as claimed in claim 13, wherein said remote information storage center includes a self-test diagnostic capability means for allowing access to a fault history map used to isolate malfunctions of one of system, components, telephone links and television broadcast channels.

18. A system as claimed in claim 13, further comprising a computer based adaptive billing sub-system for tracking subscriber activity.

19. A bi-directional, interactive communications system for transmitting in a digital format, information services to a plurality of subscriber locations on demand, said bi-directional communications system comprising:
- a remote information services storage center for storing a variety of information service programs,
- a television broadcast facility for uni-directionally transmitting a selected one of said variety of information service programs,
- a home computing assembly disposed at each subscriber location and connected bi-directionally by telephone lines to the remote information services storage center and also being linked to the television broadcast facility,
- a television receiver connected to said home computing assembly,
- said home computing assembly being structured to request over telephone lines one of said variety of information services from said remote information services storage center by transmission of an identification code, an information service select code, verification of existence of a previously loaded information service software, and any mode commands from said home computing assembly, and in response the remote information services storage center determines if the selected information service is already resident in the home computing assembly, and if so, transmits an authorization code to the home computing assembly to enable the previously loaded service software, and if not, the remote information services storage center transmits digital streams of data from the remote information services storage center to the television broadcast facility and transfers the digital streams of data from the television broadcast facility to said home computing assembly for storage by said home computing assembly upon comparison and matching of an identification code of said home computing assembly with an individually addressed code transmitted from said remote information services storage center, and said home computing assembly including decoder means tuned to a television broadcast channel of said television receiver for monitoring the digital streams of data as transmitted from the television broadcast facility,
- said home computing assembly including digital processing means for receiving the digital streams of data by the requested one of home computing assemblies, and
- said home computing assembly further including distributed computer processing means for invoking the selected one of said variety of information service programs to perform a task associated with one of said variety of information service programs and means to interact with one of said variety of information service programs as received from the television broadcast facility.

20. A bi-directional, interactive communications system for transmitting in a digital format, information services to a plurality of subscriber locations on demand, said bi-directional communications system comprising:
- a remote information services storage center for storing a mall shopping service program,
- a television broadcast facility for uni-directionally transmitting the mall shopping service program,
- a home computing assembly disposed at each subscriber location and connected bi-directionally by telephone liens to the remote information services storage center and also being linked to the television broadcast facility,
- a television receiver connected to said home computing assembly,
- said home computing assembly being structured to receive an individually addressed code form the remote information services storage center and to cause transfer of digital streams of data from the remote information services storage center to the television broadcast facility and transfer of the digital streams of data of the television broadcast facility to said home computing assembly for storage by said home computing assembly upon comparison and matching of an identification code of sd home computing assembly with said individually addressed code as received form said remote information services storage center, and
- said home computing assembly including decoder means tuned to a television broadcast channel of said television receiver for monitoring the digital streams of data as transmitted from the television broadcast facility,
- said home computing assembly including digital processing means for receiving the digital streams of data by the requesting one of home computing assemblies, and
- said home computing assembly further including distributed computer processing means for invoking the mall shopping service program and to perform a task associated with the mall shopping service program and means to interact with the mall shopping service program as received from the television broadcast facility.

* * * * *